United States Patent
Liu

(10) Patent No.: US 12,306,583 B2
(45) Date of Patent: May 20, 2025

(54) HOLOGRAPHIC DISPLAY METHOD AND HOLOGRAPHIC DISPLAY SYSTEM

(71) Applicant: TCL China Star Optoelectronics Technology Co., Ltd., Guangdong (CN)

(72) Inventor: Jinfeng Liu, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 952 days.

(21) Appl. No.: 17/430,404

(22) PCT Filed: May 31, 2021

(86) PCT No.: PCT/CN2021/097499
§ 371 (c)(1),
(2) Date: Aug. 12, 2021

(87) PCT Pub. No.: WO2022/147956
PCT Pub. Date: Jul. 14, 2022

(65) Prior Publication Data
US 2023/0134309 A1    May 4, 2023

(30) Foreign Application Priority Data
Jan. 7, 2021   (CN) .......................... 202110018233.4

(51) Int. Cl.
*G03H 1/00*   (2006.01)
*G02B 27/00*  (2006.01)
(Continued)

(52) U.S. Cl.
CPC ....... *G03H 1/0005* (2013.01); *G02B 27/0093* (2013.01); *G02F 1/133524* (2013.01); *G02F 1/133623* (2021.01); *G03H 1/2294* (2013.01)

(58) Field of Classification Search
CPC .... G02B 2027/0178; G02B 2027/0172; G02B 2027/014; G02B 2027/0134;
(Continued)

(56) References Cited

U.S. PATENT DOCUMENTS

| | | | |
|---|---|---|---|
| 2005/0117186 A1* | 6/2005 | Li | ........................ H04N 9/643 348/E9.04 |
| 2016/0070113 A1* | 3/2016 | Travis | .................. G02B 6/0056 349/18 |

(Continued)

FOREIGN PATENT DOCUMENTS

| | | |
|---|---|---|
| CN | 101859550 | 10/2010 |
| CN | 101950550 | 1/2011 |

(Continued)

*Primary Examiner* — Jyotsna V Dabbi

(57) ABSTRACT

A holographic display method and a holographic display system are provided. The holographic display method includes: obtaining target scene information; recognizing human face area information of the target scene information; confirming a pupil position of the human face area information; calculating a lateral viewing angle between each pixel area and each pupil position in a display panel and a driving voltage value of each pixel area at the lateral viewing angle corresponding to each pixel area; and applying the driving voltage value to the corresponding pixel area.

16 Claims, 2 Drawing Sheets

(51) Int. Cl.
*G02F 1/1335* (2006.01)
*G03H 1/22* (2006.01)

(58) Field of Classification Search
CPC .... G02B 2027/0118; G02B 2027/0138; G02B 27/01; G02B 27/0101; G03H 1/0005; G03H 1/2294; G02F 1/133623; G02F 1/133524; H04N 13/366; H04N 13/383; H04N 9/68; H04N 9/09; H04N 9/30; G06F 3/013; G06F 3/012; G06T 7/40; G06T 7/10; G06T 7/11; G06T 7/194; G06T 7/12; G06T 7/44; G06T 7/62; G06T 7/66; G06T 7/73; G09G 2320/0242; G09G 2320/0666; G09G 2320/068; G09G 2320/028; G09G 2320/0673; G09G 3/36; G09G 3/3611; G06N 3/045; G06N 3/0464; G06N 3/08; G06N 3/084; G06V 40/10; G06V 40/16; G06V 40/161; G06V 40/165; G06V 40/172; G06V 40/168; G06V 40/171; G06V 40/18

USPC .................................................. 359/1
See application file for complete search history.

(56) References Cited

U.S. PATENT DOCUMENTS

| 2019/0014884 | A1* | 1/2019 | Fu ........................ G06T 19/20 |
| 2021/0088788 | A1* | 3/2021 | Choi ..................... G02B 6/0038 |
| 2021/0390897 | A1* | 12/2021 | Kim ...................... G09G 3/3208 |
| 2022/0121839 | A1* | 4/2022 | Tagra .................... G06V 40/172 |

FOREIGN PATENT DOCUMENTS

| CN | 103888742 | 6/2014 | |
| CN | 206532099 | 9/2017 | |
| CN | 109359522 | 2/2019 | |
| CN | 109658876 | 4/2019 | |
| CN | 111091785 | 5/2020 | |
| CN | 112863453 | 5/2021 | |
| WO | WO 02/093483 | 11/2002 | |
| WO | WO 2005/052673 | 6/2005 | |
| WO | WO-2017036160 A1 * | 3/2017 | ............ G06K 9/00 |

* cited by examiner

HOLOGRAPHIC DISPLAY METHOD AND HOLOGRAPHIC DISPLAY SYSTEM

RELATED APPLICATIONS

This application is a National Phase of PCT Patent Application No. PCT/CN2021/097499 having International filing date of May 31, 2021, which claims the benefit of priority of Chinese Patent Application No. 202110018233.4 filed on Jan. 7, 2021. The contents of the above applications are all incorporated by reference as if fully set forth herein in their entirety.

FIELD AND BACKGROUND OF THE INVENTION

The present disclosure relates to the field of display technologies, and more particularly, to a holographic display method and a holographic display system.

Liquid crystal display (LCD) devices are one of common electronic devices. They have features such as low power consumption, small size, and light weight, and therefore are popular among customers. Conventional LCD devices are mainly thin-film transistor (TFT) LCD devices. In LCD devices, an arrangement of liquid crystal molecules can be controlled by determining if a voltage is applied to an electrode substrate. As such, light is blocked or is able to pass through a liquid crystal layer, thereby realizing a grayscale display. However, when the LCD devices are applied to holographic display technologies, a color shading issue commonly occurs on the LCD devices due to optical-anisotropic properties of liquid crystals and influences of viewing angles and voltage. Therefore, colors of images are distorted when the images are viewed at different viewing angles, which affects a viewing experience when the LCD devices are viewed at large viewing angles.

Nowadays, the color shading issue is usually addressed by adjusting hardware (for example, changing a four-domain pixel structure to an eight-domain pixel structure). However, if doing so, transmittance of LCD panels would be reduced, causing a reduction of a usage rate of the LCD panels.

Therefore, how to alleviate a color-shading issue occurring when LCD devices are viewed at different viewing angles without affecting transmittance of the LCD devices is a technical problem to be solved by those who are skilled in this art.

Regarding the technical problem: in conventional technologies, a four-domain pixel structure is changed to an eight-domain pixel structure to alleviate a color shading issue occurring when LCD devices are viewed at different viewing angles, which makes transmittance of LCD panels reduced, and further causes a reduction of a usage rate of the LCD panels.

SUMMARY OF THE INVENTION

In a first aspect, an embodiment of the present disclosure provides a holographic display method, including following steps:
S10, obtaining target scene information;
S20, recognizing human face area information of the target scene information;
S30, confirming a pupil position of the human face area information;
S40, calculating a lateral viewing angle between each pixel area and each pupil position in a display panel and a driving voltage value of each pixel area at the lateral viewing angle corresponding to each pixel area; and
S50, applying the driving voltage value to the corresponding pixel area.

In the holographic display method provided by the embodiment of the present disclosure, the S20 further includes:
S201, training a human face area detecting module; and
S202, recognizing the human face area information of the target scene information by the human face area detecting module.

In the holographic display method provided by the embodiment of the present disclosure, the S201 further includes:
S2011, providing an original image data set including a human face image to a feature extraction network, wherein the feature extraction network outputs original image feature information; and
S2022, respectively inputs the original image feature information into an area extraction network and a classification and position feedback network, wherein the area extraction network is configured to extract a histogram of oriented gradient (HOG) feature of a predetermined area, and the classification and position feedback network is configured to classify the HOG feature and output human face area information.

In the holographic display method provided by the embodiment of the present disclosure, in the S2011, the feature extraction network is trained by a convolutional neural network module to obtain the original image feature information.

In the holographic display method provided by the embodiment of the present disclosure, in the S2012, in the area extraction network, using a plurality of sliding windows with different sizes to encircle parts of an area having the original image feature information as a selected area and creating a ROIs, wherein the ROIs is configured to extract the HOG feature of the selected area and output the HOG feature to the classification and position feedback network.

In the holographic display method provided by the embodiment of the present disclosure, the step of creating the ROIs further includes following steps:
grouping each sub-pixel of parts of the selected area of the area having the original image feature information;
calculating a texture feature of each group; and
combining the texture feature with two groups of the sub-pixel which are the most similar to each other, wherein the ROIs is finally obtained after all sub-pixels in a certain space are combined with each other.

In the holographic display method provided by the embodiment of the present disclosure, the S30 further includes following steps:
S301, confirming whether a character of the human face area information wears glasses, removing glasses information if the character of the human face area information wears glasses, and extracting an important feature of face from other parts of the human face area information; and
S302, confirming a pupil position of the human face area information according to the important feature of face of the human face area information.

In the holographic display method provided by the embodiment of the present disclosure, in the S301, directly extracting the important feature of face from the human face information if the character of the human face area information does not wear glasses.

In the holographic display method provided by the embodiment of the present disclosure, the S302 further includes:

S3021, segmenting and extracting an image of the human face area information to obtain the important feature of face of the human face area information; and S3022, calculating the pupil position according to an eyes area information, wherein the important feature of face includes the eyes area information of the human face area information, and the pupil position is a relative position between a pupil of the eyes area information and the display panel.

In the holographic display method provided by the embodiment of the present disclosure, the S40 further includes:

S401, calculating the lateral viewing angle between each pixel area and each pupil position in the display panel and the driving voltage value of each pixel area at the lateral viewing angle corresponding to each pixel area; and S402, calculating the driving voltage value of each pixel area at the lateral viewing angle corresponding to each pixel area according to the lateral viewing angle and driving voltage information stored in an internal register of the display panel.

In the holographic display method provided by the embodiment of the present disclosure, the lateral viewing angle and the driving voltage information are obtained by following steps:

testing a degree of color shading of the display panel at different viewing angles;

calculating a compensation value of voltage difference corresponding to the degree of color shading;

applying the compensation value of voltage difference to a corresponding sub-pixel to obtain a corresponding driving voltage value, thereby making a brightness of the display panel at a current sampled viewing angle same as a brightness of the display panel at a front viewing angle;

calculating the driving voltage at each viewing angle by a linear interpolation or a linear regression according to the sampled viewing angle and the compensation value of voltage difference corresponding to the sampled viewing angle; and storing the driving voltage value into the internal register of the display panel to finally obtain the viewing angle and driving voltage information.

In a second aspect, an embodiment of the present disclosure provides a holographic display system, including a light beam controlling system, a light guiding system, a display device, and a target scene obtaining system;

wherein the target scene obtaining system is configured to obtain target scene information, the holographic display system recognizes a pupil position of the target scene information, calculates a lateral viewing angle between each pixel area and each pupil position in a display panel and a driving voltage value of each pixel area at the lateral viewing angle corresponding to each pixel area, and applies the driving voltage value to the corresponding pixel area.

In the holographic display system provided by the embodiment of the present disclosure, the target scene information includes image information of a moving character and image information of a stationary background.

In the holographic display system provided by the embodiment of the present disclosure, wherein the holographic display system recognizes human face area information of the target scene information according to a human face area detecting module, and confirms the pupil position of the human face area information.

In the holographic display system provided by the embodiment of the present disclosure, the pupil position is a relative position between a pupil of the eyes area information and the display panel.

In the holographic display system provided by the embodiment of the present disclosure, the target scene obtaining system includes a pupil tracker, the pupil tracker is a color camera; and the light beam controlling system includes a backlight module, the light guiding system includes a light guiding thin film or a light guiding plate, and the display device includes a liquid crystal display.

In the holographic display system provided by the embodiment of the present disclosure, an internal register of the display panel stores viewing angle and driving voltage information, and the holographic display system obtains the driving voltage value of each pixel area in the display device at a current lateral viewing angle according to the viewing angle and driving voltage information.

Regarding the beneficial effects: compared with conventional technologies, in an embodiment of the present disclosure, corresponding driving voltage values of each sub-pixel of a display image of a holographic display system viewed at different viewing angles are adjusted. Therefore, viewing angles of LCD panels could be increased without affecting transmittance of the LCD panels.

DETAILED DESCRIPTION OF SPECIFIC EMBODIMENTS OF THE INVENTION

An embodiment of the present disclosure aims to solve a following technical problem: conventionally, a color shading issue occurring when LCD devices are viewed at different viewing angles is alleviated by adjusting hardware of the LCD devices, which causes transmittance of LCD panels to be reduced, and further results in a reduction of a usage rate of the LCD panels.

Figure 1:
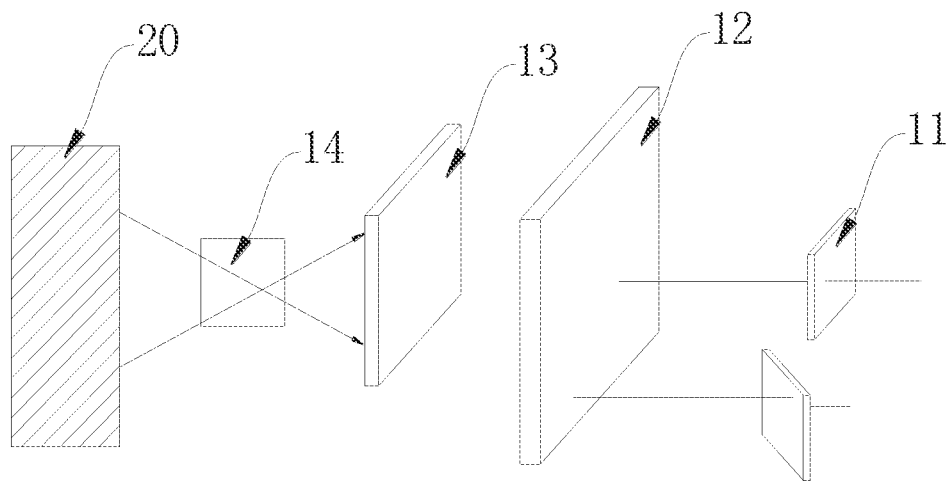
FIG. 1 is a mapping relationship diagram showing a relationship between an internal module of a holographic display system provided by an embodiment of the present disclosure and target scene information.

As shown in FIG. 1, the present embodiment provides a holographic display system, including a light beam controlling system 11, a light guiding system 12, a display device 13, and a target scene obtaining system 14.

Wherein, the display device 13 includes an LCD device, and the display device 13 is configured to display target scene information 20.

The target scene obtaining system 14 is configured to obtain the target scene information 20. The target scene obtaining system 14 includes a pupil tracker. Preferably, the pupil tracker is a color camera. The light beam controlling system 11 includes a backlight module. The light guiding system 12 includes a light guiding thin film or a light guiding plate. The light guiding system 12 is configured to increase a usage rate of the backlight module.

Specifically, the holographic display system recognizes a pupil position of the target scene information 20 and calculates a lateral viewing angle between each pixel area of the display device 13 and the pupil position and a driving voltage value of each pixel area viewed at the corresponding lateral viewing angle, and then applies the driving voltage values to the corresponding pixel area. Wherein, the lateral viewing angle is an angle between line of human sight and a plane of the display device 13. The pupil position is a relative position between a pupil of human eye and the display device 13.

Furthermore, the holographic display system recognizes human-face area information of the target scene information 20 by the human-face area detecting module, and confirms the pupil position of the human-face area information.

Specifically, viewing angle and driving voltage information is stored in an internal register of the display device 13. The holographic display system can obtain the driving voltage value of each pixel area in the display device at a current lateral viewing angle according to the viewing angle and driving voltage information. Therefore, human eyes can see an image with normal colors at a current lateral viewing angle.

Furthermore, a scene extracting frequency of the target scene obtaining system 14 is adjusted to immediately trace the pupil position. Therefore, the driving voltage value of the corresponding pixel can be adjusted immediately according to an angle between human position and the display device 13. As such, a color shading can be compensated immediately, and a wider viewing angles can be realized.

In the holographic display system provided by the present embodiment, the lateral viewing angle between each pixel area and the pupil position and the driving voltage value of each pixel area at the corresponding lateral viewing angle are calculated, and pupil tracking technology is applied to realize a real-time drive. Therefore, within a certain range, a range of viewing angles of the display device changes following changes in a pupil position (human position). A specific working process is described as follows:

first, confirming the pupil position of the target scene information by the target scene system. Then, calculating a lateral viewing angle between each pixel area and the pupil position and the driving voltage value of each pixel area at the corresponding lateral viewing angle. Finally, applying the driving voltage value to the corresponding pixel area to compensate a color shading. Therefore, within a certain range of viewing angles (an angle between a human and a plane of the display device), colors of an image are normal without color shading. As such, a display effect of the display device is further improved.

Figure 2:
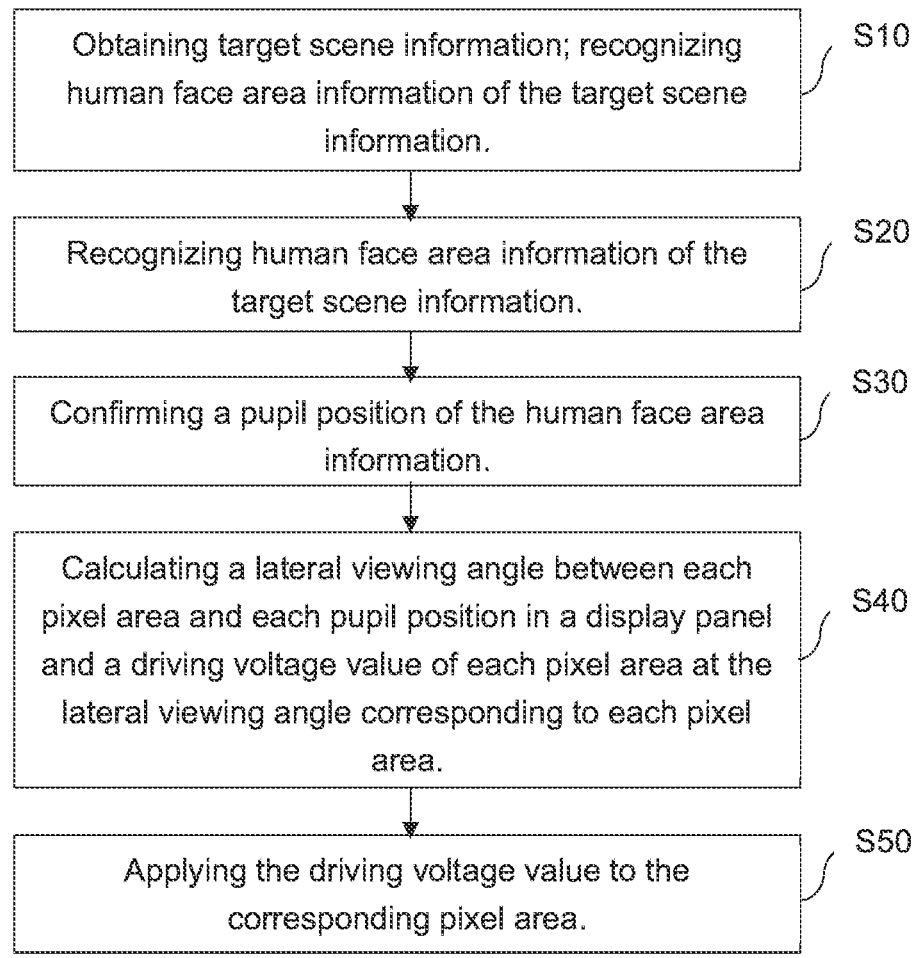
FIG. 2 is a flowchart showing a holographic display method provided by an embodiment of the present disclosure.

Please refer to FIG. 2, an embodiment of the present disclosure further provides a holographic display method, including following steps:

S10, obtaining target scene information.

Wherein, the S10 further includes following steps:

the target scene information includes moving character image information and stationary background information. The holographic display method mainly detects the moving character image information under the stationary background information. That is, a sequence of images which are changed continuously is detected. The target scene information is obtained by a pupil tracker. Preferably, the pupil tracker is a color camera.

S20, recognizing human face area information of the target scene information.

Wherein, the S20 further includes following steps:

first, training a human face area detecting module, wherein the human face area detecting module recognizes the human face area information of the target scene information.

Specifically, the human face area detecting module includes: providing an original image data set including a human face image to a feature extraction network, wherein the feature extraction network outputs original image feature information; and respectively inputting the original image feature information into an area extraction network and a classification and position feedback network, wherein the area extraction network is configured to extract a histogram of oriented gradient (HOG) feature of a predetermined area. HOG is a feature descriptor configured to detect objects during vision and image processes of computers. The classification and position feedback network classifies the HOG feature and outputs the human face area information.

Figure 3:
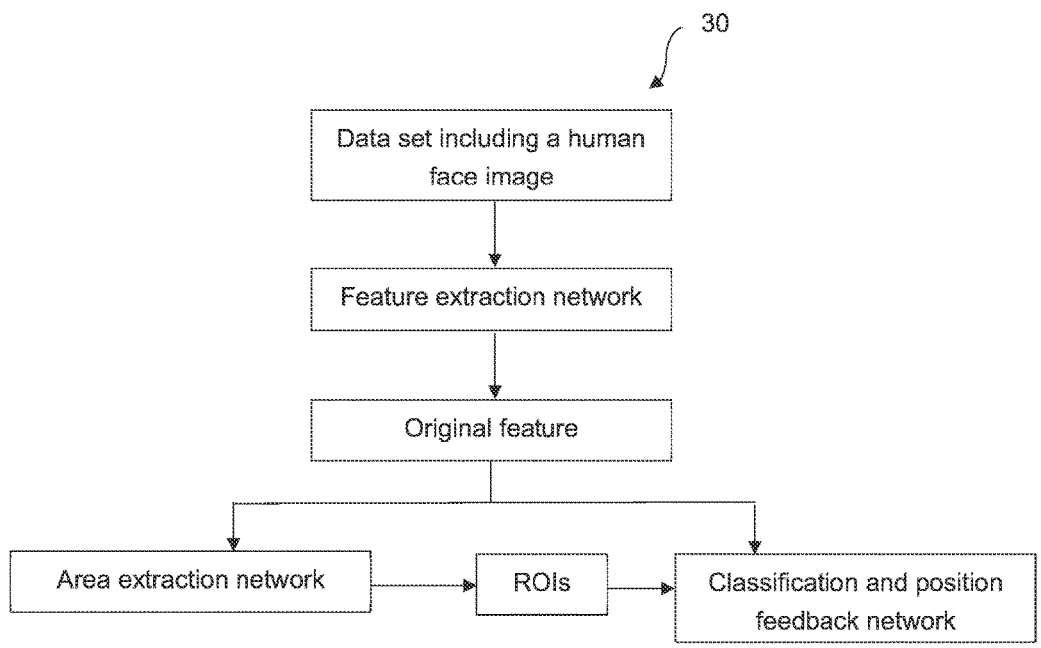
FIG. 3 is a schematic frame view showing a human-face extracting process of a human-face area detecting module provided by an embodiment of the present disclosure.

As shown in FIG. 3, a schematic frame view of a human-face extracting process of the human-face area detecting module provided by the present embodiment is shown. Wherein, a specific process of training the human face area detecting module 30 is described as follows:

first, providing the original image data set including the human face image. Then, training the feature extraction network to obtain the original image feature information according to a convolutional neural networks (CNN) module of deep learning. Wherein, the deep learning is a machine learning technology that uses a representation learning method, which allows a machine to get original data and confirm representation required by data classification. The deep learning is configured to use a backpropagation algorithm to change parameters, such as a weight of a node, to confirm a structure of data concentration. A deep learning machine can use multiple types of multi-layer structures and algorithms. For example, although machine learning relates to recognizing features used to train a network, the deep learning processes original data to recognize a region of interests (ROIs) without external recognition. CNN is a feedforward neural network. Neurons of the CNN can affect units, including a convolutional layer and a pooling layer, surrounding parts of a covered range.

Then, the original image feature information is inputted into the area extraction network and the classification and position feedback network, respectively. In the area extraction network, a plurality of sliding windows with different sizes are used to encircle parts of an area having the original image feature information as a selected area, and the ROIs is formed, wherein the ROIs is configured to extract the HOG feature of the selected area and output the HOG feature to the classification and position feedback network.

Finally, the classification and position feedback network classifies and recognizes the HOG features, corresponds the HOG features to each area of human face, and outputs the human face area information, thereby obtaining the human face area detecting module 30.

Specifically, the step of creating the ROIs further includes following steps:

grouping each sub-pixel of parts of the selected area of the area having the original image feature information, calculating a texture feature of each group, and combining the texture feature with two groups of the sub-pixel which are the most similar to each other. The ROIs is finally obtained after all sub-pixels in a certain space are combined with each other. Wherein, a texture feature calculating method mainly includes a histogram analysis method and a boundary frequency analysis method.

S30, confirming a pupil position of the human face area information.

Figure 4:
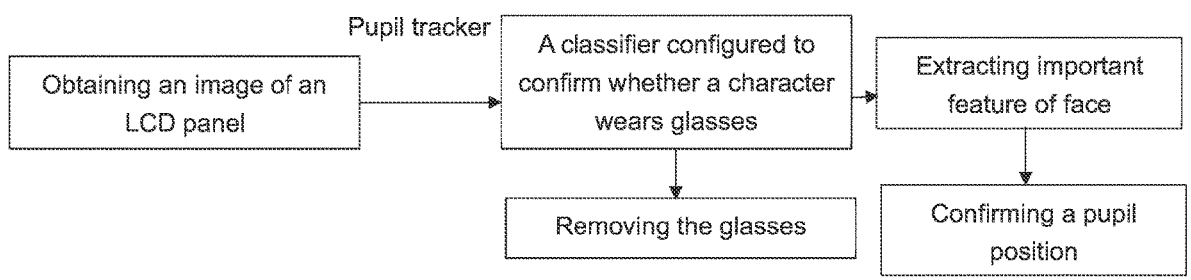
FIG. 4 is a frame diagram showing a pupil tracking algorithm provided by an embodiment of the present disclosure.

Specifically, the S30 further includes following steps:

first, designing a classifier according to the CNN module of deep learning to confirm if a character of the human face area information wears glasses. If the character of the human face area information wears glasses, removing glasses information by an image processing algorithm of deep learning, and extracting an important feature of face from other parts of the human face area information. If the character of the human face area information does not wear glasses, directly extracting the important feature of face from the human face information. Then, confirming the pupil position of the human face area information according to the important feature of face of the human face area information, as shown in FIG. 4.

Wherein, the image processing algorithm of deep learning includes a generative adversarial networks (GAN) algorithm which is an unsupervised learning algorithm provided by Ian Goodfellow in 2014. A main principle of this algorithm is to make a target generative network G battle with a target adversarial network D on a 0-1 game during a training process. Finally, a result is converged to one target generative network G. By inputting a random vector to the target generative network G, a data which is judged to be true by a classifier which is compared favorably with a real classifier D can be obtained.

Specifically, segmenting and extracting an image of the human face area information by a deep learning image feature extraction technology to obtain the important feature of face of the human face area information. The important feature of face includes eyes area information of the human face area information. A pupil position is calculated according to the eyes area information. The pupil position is a relative position between a pupil of the eyes area information and the display panel. The specific pupil position can be confirmed according to an autoencoder algorithm o deep learning.

Specifically, the segmenting and extracting step is to classify each pixel point of an image and confirm a category of each pixel point, thereby segmenting an area to obtain the eyes area information of the human face area information. The deep learning image feature extraction technology includes a fully convolutional networks (FCN) algorithm and a convolutional network for biomedical image segmentation (U-Net) algorithm which is used to segment biomedical images. Wherein, a principle of the FCN algorithm is to use continuous layers to supply regular convolutional networks, which replaces a pooling operation with an upsampling operation. The U-Net algorithm is mainly used to realize image segmentation based on the FNC algorithm, which amends and expands a structure of the FCN algorithm. Therefore, the FNC algorithm can use and form a more accurate segmentation with very few training images.

S40, calculating a lateral viewing angle between each pixel area and each pupil position in a display panel and a driving voltage value of each pixel area at the lateral viewing angle corresponding to each pixel area.

Specifically, the S40 includes following steps:

first, calculating the lateral viewing angle between each pixel area and each pupil position in the display panel and the driving voltage value of each pixel area at the lateral viewing angle corresponding to each pixel area. Then, calculating the driving voltage value of each pixel area at the lateral viewing angle corresponding to each pixel area according to the lateral viewing angle and driving voltage information stored in an internal register of the display panel.

Wherein, the lateral viewing angle and the driving voltage information are obtained by following steps:

first, testing a degree of color shading of the display panel at different viewing angles such as 15°, 30°, 45°, 60°, or 75°, wherein the viewing angles can be changed according to an actual situation and calculating a compensation value of voltage difference corresponding to the degree of color shading. Then, applying the compensation value of voltage difference to a corresponding sub-pixel to obtain a corresponding driving voltage value, thereby making a brightness of the display panel at a current sampled viewing angle same as a brightness of the display panel at a front viewing angle. After that, calculating the driving voltage at each viewing angle by a linear interpolation or a linear regression according to the sampled viewing angle and the compensation value of voltage difference corresponding to the sampled viewing angle, and storing the driving voltage value into the internal register of the display panel to finally obtain the viewing angle and driving voltage information.

S50, applying the driving voltage value to the corresponding pixel area, thereby making colors of the image viewed at the current lateral viewing angle normal.

The present embodiment provides a holographic display method based on deep learning. By adjusting a corresponding driving voltage value of each sub-pixel of an image displayed by a holographic display system and applying a pupil tracking technology to realize a real-time drive, a range of viewing angles of a display panel changes following changes in a pupil position (human position). Finally, by confirming the pupil position to adjust a pixel voltage of an entire display image to compensate color shading, colors of the image viewed by people are normal without color shading within a certain range of viewing angles (an angle between line of human sight and the display panel). Therefore, quality of the display panel is improved.

In summary, the present embodiment provides a holographic display method and a holographic display system, by adjusting a corresponding driving voltage value of each sub-pixel of an image displayed by a holographic display system, viewing angles of LCD panels can be wider without affecting transmittance of the LCD panel.

Each operation can be specifically referred to the above-mentioned embodiment and is not described here again.

It should be noted that many changes and modifications to the described embodiments can be carried out by those skilled in the art, and all such changes and modifications are intended to be included within the scope of the appended claims.

What is claimed is:

1. A holographic display method, comprising following steps:

S10, obtaining target scene information;

S20, recognizing human face area information of the target scene information;

S30, confirming a pupil position of the human face area information;

S40, calculating a lateral viewing angle between each pixel area and each pupil position in a display panel and a driving voltage value of each pixel area at the lateral viewing angle corresponding to each pixel area; and S50, applying the driving voltage value to the corresponding pixel area;

wherein the S20 further comprises following steps:

S201, training a human face area detecting module; and

S202, recognizing the human face area information of the target scene information by the human face area detecting module;

wherein the S201 further comprises:

S2011, providing an original image data set including a human face image to a feature extraction network, wherein the feature extraction network outputs original image feature information; and S2022, respectively inputting the original image feature information into an area extraction network and a classification and position feedback network, wherein the area extraction network is configured to extract a histogram of oriented gradient (HOG) feature of a predetermined area, and the classification and position feedback network is configured to classify the HOG feature and output the human face area information;

wherein in the S2022, in the area extraction network, using a plurality of sliding windows with different sizes to encircle parts of an area having the original image feature information as a selected area and creating a region of interests (ROIs), wherein the ROIs is configured to extract the HOG feature of the selected area and output the HOG feature to the classification and position feedback network;

wherein the step of creating the ROIs further comprises following steps:

grouping each sub-pixel of parts of the selected area of the area having the original image feature information;

calculating a texture feature of each group; and combining the texture feature with two groups of the sub-pixel which are the most similar to each other, wherein the ROIs is finally obtained after all sub-pixels in a certain space are combined with each other.

2. The method of claim 1, wherein in the S10, the target scene information is obtained by a pupil tracker, and the pupil tracker is a color camera.

3. The method of claim 2, wherein the target scene information comprises image information of a moving character and image information of a stationary background.

4. The method of claim 1, wherein in the S2011, the feature extraction network is trained by a convolutional neural network module to obtain the original image feature information.

5. The method of claim 1, wherein a method for calculating the texture feature comprises a histogram analysis method and a boundary frequency analysis method.

6. The method of claim 1, wherein the S30 further comprises following steps:

S301, confirming whether a character of the human face area information wears glasses, removing glasses information if the character of the human face area information wears glasses, and extracting an important feature of face from other parts of the human face area information; and S302, confirming the pupil position of the human face area information according to the important feature of face of the human face area information.

7. The method of claim 6, wherein in the S301, directly extracting the important feature of face from the human face information if the character of the human face area information does not wear glasses.

8. The method of claim 6, wherein the S302 further comprises:

S3021, segmenting and extracting an image of the human face area information to obtain the important feature of face of the human face area information; and S3022, calculating the pupil position according to an eyes area information, wherein the important feature of face comprises the eyes area information of the human face area information, and the pupil position is a relative position between a pupil of the eyes area information and the display panel.

9. The method of claim 1, wherein the S40 further comprises:

S401, calculating the lateral viewing angle between each pixel area and each pupil position in the display panel and the driving voltage value of each pixel area at the lateral viewing angle corresponding to each pixel area; and S402, calculating the driving voltage value of each pixel area at the lateral viewing angle corresponding to each pixel area according to the lateral viewing angle and driving voltage information stored in an internal register of the display panel.

10. The method of claim 9, wherein the lateral viewing angle and the driving voltage information are obtained by following steps:

testing a degree of color shading of the display panel at different viewing angles;

calculating a compensation value of voltage difference corresponding to the degree of color shading;

applying the compensation value of voltage difference to a corresponding sub-pixel to obtain a corresponding driving voltage value, thereby making a brightness of the display panel at a current sampled viewing angle same as a brightness of the display panel at a front viewing angle;

calculating the driving voltage at each viewing angle by a linear interpolation or a linear regression according to the sampled viewing angle and the compensation value of voltage difference corresponding to the sampled viewing angle; and storing the driving voltage value into the internal register of the display panel to finally obtain the lateral viewing angle and driving voltage information.

11. A holographic display system, comprising a light beam controlling system, a light guiding system, a display device, and a target scene obtaining system;

wherein the target scene obtaining system is configured to obtain target scene information, the holographic display system is configured to recognize a pupil position of the target scene information, calculate a lateral viewing angle between each pixel area and each pupil position in a display panel and a driving voltage value of each pixel area at the lateral viewing angle corresponding to each pixel area, and apply the driving voltage value to the corresponding pixel area;

wherein the holographic display system is further configured to recognize human face area information of the target scene information by training a human face area detecting module;

wherein training the human face area detecting module comprises steps of:

providing an original image data set including a human face image to a feature extraction network, wherein the feature extraction network outputs original image feature information; and respectively inputting the original image feature information into an area extraction network and a classification and position feedback network, wherein the area extraction network is configured to extract a histogram of oriented gradient (HOG) feature of a predetermined area, and the classification and position feedback network is configured to classify the HOG feature and output the human face area information;

wherein in the area extraction network, steps of using a plurality of sliding windows with different sizes to encircle parts of an area having the original image feature information as a selected area and creating a region of interests (ROIs) is performed, wherein the ROIs is configured to extract the HOG feature of the selected area and output the HOG feature to the classification and position feedback network;

wherein the step of creating the ROIs further comprises following steps:

grouping each sub-pixel of parts of the selected area of the area having the original image feature information;

calculating a texture feature of each group; and combining the texture feature with two groups of the sub-pixel which are the most similar to each other, wherein the ROIs is finally obtained after all sub-pixels in a certain space are combined with each other.

12. The holographic display system of claim 11, wherein the target scene information comprises image information of a moving character and image information of a stationary background.

13. The holographic display system of claim 11, wherein the holographic display system is further configured to confirm the pupil position of the human face area information.

14. The holographic display system of claim 13, wherein the pupil position is a relative position between a pupil of the eyes area information and the display panel.

15. The holographic display system of claim 11, wherein the target scene obtaining system comprises a pupil tracker, the pupil tracker is a color camera; and the light beam controlling system comprises a backlight module, the light guiding system comprises a light guiding thin film or a light guiding plate, and the display device comprises a liquid crystal display.

16. The holographic display system of claim 11, wherein an internal register of the display panel stores lateral viewing angle and driving voltage information, and the holographic display system obtains the driving voltage value of each pixel area in the display device at a current lateral viewing angle according to the lateral viewing angle and driving voltage information.

* * * * *